United States Patent
Oscherov et al.

(10) Patent No.: US 11,768,835 B2
(45) Date of Patent: Sep. 26, 2023

(54) MERGING MULTIPLE UNSYNCHRONIZED STREAMS OF RELATED EVENTS AND MULTI-TENANT SUPPORT

(71) Applicant: Salesforce, Inc., San Francisco, CA (US)

(72) Inventors: Alexander Oscherov, Danville, CA (US); Victor Spivak, San Mateo, CA (US); Scott Roderick Young, Palo Alto, CA (US); Rohit Deshpande, Fremont, CA (US); Nikita Mundhada, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/777,885

(22) Filed: Jan. 31, 2020

(65) Prior Publication Data
US 2021/0240712 A1 Aug. 5, 2021

(51) Int. Cl.
*G06F 16/245* (2019.01)
*G06F 16/2455* (2019.01)

(52) U.S. Cl.
CPC .......... *G06F 16/24568* (2019.01); *G06F 16/24558* (2019.01)

(58) Field of Classification Search
None
See application file for complete search history.

(56) References Cited

U.S. PATENT DOCUMENTS

| | | | |
|---|---|---|---|
| 7,730,478 B2 | 6/2010 | Weissman | |
| 9,497,250 B2* | 11/2016 | Branson | G06F 16/24568 |
| 9,959,334 B1* | 5/2018 | Bar-Zeev | G06F 16/2477 |
| 11,080,420 B2 | 8/2021 | Rickard et al. | |
| 2008/0092054 A1* | 4/2008 | Bhumkar | G06F 16/957 |
| 2011/0314007 A1* | 12/2011 | Dassa | G06F 16/22 707/723 |
| 2012/0278428 A1* | 11/2012 | Harrison | G06F 16/9535 |
| 2014/0215443 A1* | 7/2014 | Voccio | G06F 16/245 |
| 2014/0236953 A1* | 8/2014 | Rapaport | G06F 16/285 707/740 |
| 2015/0043892 A1* | 2/2015 | Groman | G06F 16/245 |
| 2015/0163206 A1* | 6/2015 | McCarthy | G06F 16/901 |
| 2015/0188955 A1* | 7/2015 | Albouyeh | G06F 16/93 |
| 2015/0350956 A1* | 12/2015 | Bell | G06F 16/24568 |
| 2015/0358303 A1* | 12/2015 | Hui | G06F 16/24 707/736 |
| 2016/0021182 A1* | 1/2016 | Bansal | G06F 16/245 |
| 2016/0182251 A1* | 6/2016 | Weygandt | G06F 16/24568 707/603 |
| 2018/0159731 A1* | 6/2018 | Murthy | G06F 16/24558 |

(Continued)

*Primary Examiner* — Son T Hoang
(74) *Attorney, Agent, or Firm* — Nicholson, De Vos, Webster & Elliott, LLP

(57) ABSTRACT

A method and system for handling asynchronous data streams in a multi-tenant system. The process includes receiving at least a first stream of data and a second stream of data by a rules engine, determining by pattern matching of the rules engine, whether data in the first stream or data in the second stream meet conditions of a rule defined by a tenant of the multi-tenant system, and implementing by the rules engine the rule including a set of actions to modify data from the second data stream, in response to the data in the first stream matching the conditions the rule.

20 Claims, 8 Drawing Sheets

(56) References Cited

U.S. PATENT DOCUMENTS

| | | |
|---|---|---|
| 2018/0239924 A1 | 8/2018 | Rickard et al. |
| 2018/0260914 A1* | 9/2018 | Kemp .................. G06F 16/288 |
| 2019/0140995 A1 | 5/2019 | Roller et al. |
| 2021/0216724 A1* | 7/2021 | Agarwal ........... G06F 16/90332 |
| 2021/0240714 A1* | 8/2021 | Ho .......................... G06F 16/27 |

* cited by examiner

MERGING MULTIPLE UNSYNCHRONIZED STREAMS OF RELATED EVENTS AND MULTI-TENANT SUPPORT

TECHNICAL FIELD

One or more implementations relate to the field of event management; and more specifically, to processes for handling unsynchronized streaming events, including support for such processes in a multi-tenant environment.

BACKGROUND ART

Web applications that serve and manage millions of Internet users, such as Facebook™, Instagram™, Twitter™, banking websites, as well as online retail shops, such as Amazon.com™ or eBay™ are faced with the challenge of ingesting high volumes of data as fast as possible so that the end users can be provided with a real-time experience. The "Internet of Things" (IoT) is another major contributor to big data, supplying huge volumes of data. IoT has become a pervasive presence in the environment, with a variety of things/objects that communicate via wireless and wired connections to interact with each other and cooperate with other things/objects to create new applications/services. These applications/services exist in smart cities (regions), smart cars and mobility, smart homes and assisted living, smart industries, public safety, energy and environmental protection, agriculture and tourism. A massive quantity of data gets persisted from the millions of IoT devices and web applications.

Event management systems can be utilized to manage data distribution in these types of systems. In current event management systems, a high volume of events is published by multiple event producers and then delivered to multiple consumers. The event management system is a large scale, asynchronous, distributed system where failures are inevitable due to network failures, equipment failures and similar issues. Events are organized into different streams. Publishing events as part of event streams is asynchronous. As a result, events in different event streams handled by the event management platform that may have relationships with one another cannot be handled be resolved in a simple deterministic manner. Specialized solutions to resolve the interrelations between events requires complicated and event relationship specific caching and coding to resolve. Such solutions involved significant overhead in design and implementation and are not scalable. In addition, such solutions are not designed to operate in multi-tenant environments.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for handling unsynchronized streaming events, including support for such processes in a multi-tenant environment.

Figure 1:
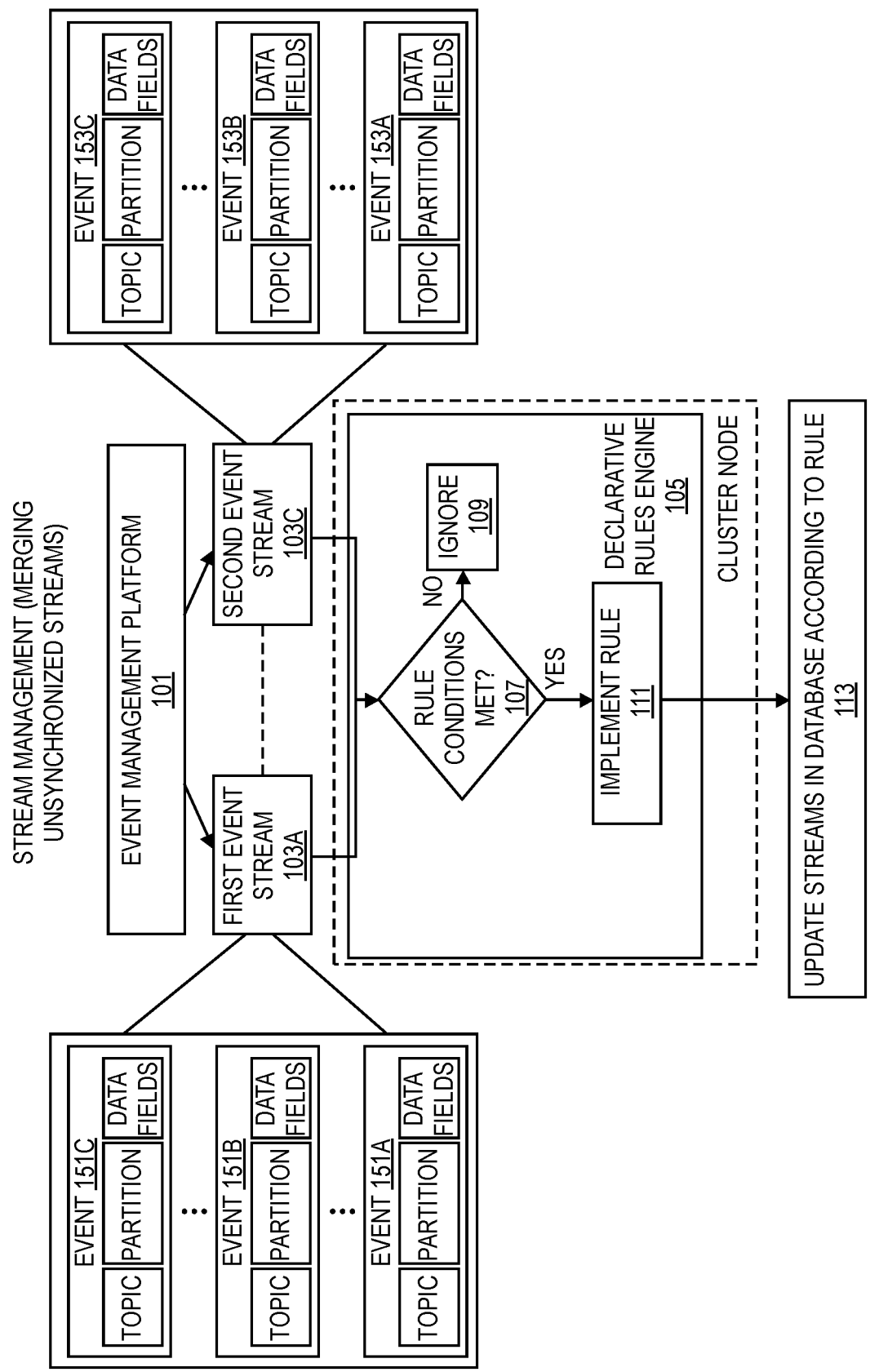
FIG. 1 is a block diagram illustrating a process for merging unsynchronized event streams according to some example implementations.

FIG. 1 is a block diagram illustrating a process for merging unsynchronized event streams according to some example implementations. Event processing is a method of managing and processing streams of data that are continuously being generated. The data can be related to any subject and come from any source. The data, as it is generated, can be referred to as events. Processing of the events to derive further information or to make decisions can be done through simple or complex processes (e.g., complex event processing (CEP)), The handling of the events can be managed in an event management platform 101 that receives events from event producers, records the events, processes the events, and/or delivers the events to event consumers.

Events can originate from any number and type of event producers. Examples can include sensor data, news items, text messages, social media posts, stock market feeds, traffic reports, weather reports, software or system changes or data collection, and similar data sources. Event consumers can be software or users that subscribe to groupings of events, referred to as topics, via the event management system. Events are generated, recorded and processed asynchronously. The events can be grouped by source, content type, or similar grouping into topics. Events can be further categorized by partitions, content type, tenants, or similar classifications. Events in different streams can have interrelationships that could affect the data in the respective streams.

In one example, an Alert stream and a Mutation stream exist in an event management platform 101. The Alert stream may publish events that alert event consumers of certain types of events. The Mutation stream may publish events that notify consumers to changes in certain types of data. An alert event may notify an event consumer of an event that meets specified criteria. However, the underlying data may change before an alert event is delivered. These changes are part of the Mutation stream. Thus, an event in a Mutation stream related to a data change that affects an Alert stream event may arrive before or after the corresponding Mutation stream event. An event consumer would have better information to work with if the arrival of the events from each stream were coordinated.

To coordinate events between event streams, the event streams can be merged, such that the events in the merged streams are ordered to produce a coherent merged stream. Any number of event streams 103A-C can be merged. The relationships between events in any two or more event streams can be specific to the input event streams. Thus, ordering the events from each constituent stream can complex and require logic, caching, and similar features that are specific to the merged event streams. Changes to data across the events should have minimal latency and should function in multi-tenant environments. Rather than utilize a solution that is specific to the merged event streams 103A-C, the implementations leverage a declarative rules engine 105 that supports complex event processing.

A declarative rules engine 105 can be configured to merge multiple event streams 103A-C by declaring a set of applicable rules to correlate data across the multiple event streams within a defined timeframe. In some implementations, the timeframe can be specified per source or event stream. These implementations utilizing a declarative rules engine provide benefits of the declarative rules are externalized and a change of the rules doesn't require a change in the software or algorithm, consumers or tenants can create declarative rules to be executed by the implementations, and implementation is simplified and generalized such that it can be applied to many event stream mergers without having to explicitly manage caching and time-to-live issues related to the events.

As shown in FIG. 1, the implementations can merge event streams 103A-C produced or handled by an event management platform 101. In some implementations, the implementations are embedded within an event management platform 101, while in other implementations, the processes merge event streams after publication by the event management platform 101, but prior to receipt by a set of one or more event consumer systems. For sake of clarity and conciseness the components of the event management platform 101, including event producers and consumers are not shown.

An event (e.g., 151A-151C and 153A-153C) in the implementations is an identifiable unit of data that conveys information about operations that occur in a system (e.g., measurements recorded in an Internet of Things (IoT) device, actions performed by a user of a social networking system, failures of an operation or a system, etc.). The operations can be user-generated or system-generated. In some implementations, an event is associated with a topic. A topic can be information or details on the event that can be used to group one or more events, to publish the events, and to deliver the events to event consumers. In some implementations, an event can also be associated with a partition. The partition can be information on the event, which can be used to group multiple events. The partition and topic can be used to group events with the same topic and partition and can be used to transmit these events to one or more event consumers that requests them based on the partition and/or topic they are associated with. In a non-limiting example of a multi-tenant platform, the partition can be a tenant identifier (which can also be referred to as an organization identifier (org ID)) where each one of the tenant identifiers uniquely identifies a tenant within the system. The topic can be a word or alphanumerical value added to an event generated in the system. Other examples of topics or partitions can be contemplated without departing from the scope of the present implementations.

In some implementations an event is associated with a topic when it is generated by an event producer. In some implementations, the event is also associated with a partition when generated. The topic and/or partition can be added to the event as an additional field to the other data included in the event. The topic and partition can be used as a schema to store and retrieve the event in an event management platform 101, when this event management platform 101 includes a database.

Further examples of events include device logs, clicks on links, impressions of recommendations, numbers of logins on a particular client, server logs, user's identities (sometimes referred to as user handles or user IDs and other times the users' actual names), content posted by a user to a respective feed on a social networking service, social graph data, metadata including whether comments are posted in reply to a prior posting, another event, or an article, and so forth. Events can be in a semi-structured data format like a JSON (JavaScript Option Notation), BSON (Binary JSON), XML, Protobuf, Avro or Thrift object, which present string fields (or columns) and corresponding values of potentially different types like numbers, strings, arrays, objects, etc. JSON objects can be nested and the fields can be multi-valued, e.g., arrays, nested arrays, etc., in other implementations.

In some implementations, terabytes of events per hour arrive for processing. In some implementations, the events are sent to the event management platform 101 to be stored in one of multiple event recordation systems and intended to be consumed, in real-time, pseudo-real time, or on-demand, by one or more event consumers.

Each stream of events can include multiple events. For example, a stream can include events 151A-C or 153A-C. Each event from the stream includes a topic, and one or more additional fields. The event may also include a partition. For example, the partition can include a tenant identifier. The additional fields can be referred to as a payload of the event. For example, an event can have a topic, an optional partition, and one or more additional fields. Events of a stream may have one of multiple partitions and/or topics. Some events may share the same partition and/or the same topic.

In some implementations, when a partition refers to a tenant identifier in a multi-tenant environment, all events received with that same partition belong to the same tenant. When the topic is an alphanumerical value entered by a user of the multi-tenant system to be associated with a record, an account, a task, etc., some events of a stream may have the same topic. The topics allow the event consumers to request the events stored in the event management platform 101. While the events are described as having a respective topic and partition, in some implementations, each event may only have a topic. The partition is an optional field that can be omitted in some implementations. For example, when the partition represents the identification of a tenant, when operating in a single tenant system, the events may not have a tenant identifier and therefore only a topic can be included in an event to enable event consumers to receive the events based on the topic.

The event consumers are operative to request and consume events stored in the event management platform 101 based on the topic (and/or the partitions). The event consumers can be used for gaining insight on the data embedded in the events, for gaining insight on the operations and actions performed in the applications and/or the IoT devices, and/or for gaining insight on the environment controlled or measured by the IoT devices and/or applications. In some implementations, the instances of the event consumers can request to obtain the events and process the events to perform one or more of audit, debug and support, forensic and compliance, and/or analytics of the applications and IoT devices. In some implementations, the event consumers may be implemented in a distributed computing environment, where multiple instances of event consumers can be run on one or more servers. The event consumers can be owned and operated by a same entity such as a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). Alternatively, the one or more event consumers can be operated by multiple entities such as different customers of an event recordation and distribution service.

The event management platform may include an event delivery manager (not shown) that is coupled with the event recordation system and is operative to receive requests from the event consumers for events associated with an identified topic (or a topic and partition) and responds to these requests by transmitting events to the event consumers. The event delivery manager is operative to receive batches of events for one or more topics from the event recordation system and delivers the events without any discontinuities to the event consumers. In some implementations, the receipt of a batch of events for a given topic is a result of a request transmitted from an event consumer to the event management platform 101. The request is sent through the event delivery manager. In some implementations, transmitting a request includes subscribing to a topic. In some implementations, each event consumer is operative to subscribe to one or more topics. Alternatively, each event consumer can subscribe to a single topic and/or status topic. The event delivery manager is operative to manage the subscription and delivery of the events based on the received subscription requests. In some implementations, upon receipt of a request from an event consumer (e.g., a subscription to a topic), the event delivery manager works with a declarative rules engine 105 to manage the delivery of multiple event streams to an event consumer. For example, the event delivery manager can receive multiple subscriptions to multiple event streams along with declarative rules to be applied to in turn subscribe to the topic (and status topic) to receive the events prior to their delivery to the event consumer. The subscription can be made at an earlier time (prior to the receipt of the events) and events are continuously transmitted to the event delivery manager and declarative rules engine 105 based on this earlier subscription. The subscription can be a new subscription and only new events are transmitted.

As events are received, recorded or processed by an event management platform 101, a declarative rules engine 105 can process the events of each stream based on declarative rules specified by administrators, tenants, or similar users. The declarative rules engine 105 or similar rules engine, also referred to as a Production Rule System, implements an expert system via a rules based approach. The expert system is a knowledge based system that uses knowledge representation to process acquired knowledge into a knowledge base utilized for reasoning where the knowledge representation can express propositional and first-order logic in a concise, unambiguous, declarative manner. The declarative rules engine 105 can include an inference engine that can scale to execute a large number of rules over a large knowledge base. Rules can be formed as a two part structure that use first-order logic for reasoning over the knowledge representation. The rules define the condition or pattern to match and a set of actions to be taken when the condition or pattern is matched.

The declarative rules engine 105 can examine each event to determine whether rule conditions are met for each declarative rule that has been specified, which can be on a per tenant or per merged stream basis. The rule conditions can be a pattern that is matched against each event (Block 107), where the pattern can include values of any data field, including topic, partition, payload, or metadata in each event. The pattern can also match on environmental information such as a current time, cached information, or similar data. The pattern can include Boolean logic or similar logic to evaluate whether a condition is found in the input data. Where the pattern of the rule condition is not met, then the event does not trigger the application of a rule (Block 109).

Where the pattern of the rule condition is met, then the process implements the declarative rule (Block 111). The declarative rule can implement any set of actions defined in any computer-readable and executable language. In the context of the implementations, the actions can modify or update events in the event stream or in the event recordation system of the event management platform 101. For example, the declarative rules can be defined to filter events for a merged event stream, to update event in one event stream when associated events are received in another event stream (within a defined time frame) and similar actions. Rules can be defined to update data in associated databases (Block 113) of the event management platform 101 or other platforms or system that process event streams including both upstream and downstream systems.

In further implementations, the declarative rules engine can be adapted for scalability in a multi-tenant environment. Some rules engines are implemented as single libraries and would execute across tenants in a multi-tenant environment. To improve security and scalability, the implementations herein provide separate tenant instances of a declarative rules engine that enable each tenant to separately configure the respective declarative rules engine instance.

Figure 2:
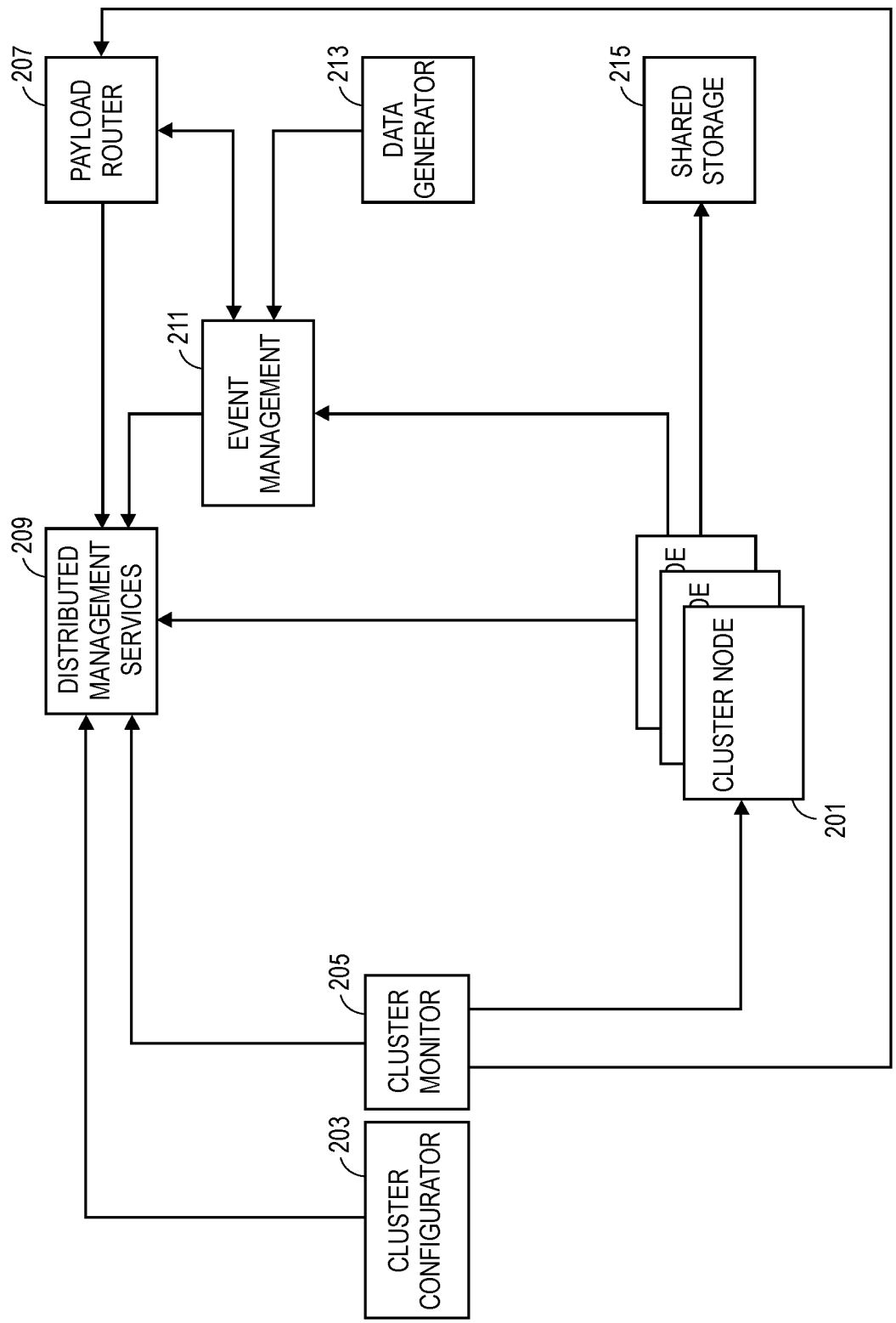
FIG. 2 is a block diagram illustrating a multi-tenant cluster node management architecture according to some example implementations.

FIG. 2 is a block diagram illustrating a multi-tenant cluster node management architecture according to some example implementations. The implementations provided herein enable rules to be defined and implemented based on tenant configuration. Instances of a declarative rules engine are implemented in a cluster computing or similar distributed or cloud computing environment. Each declarative rules engine instance is implemented in a separate cluster node in this computing environment, with the number of a cluster nodes dependent on the number of tenants and the load for each tenant such that the load is balanced across the cluster nodes for a given tenant. A consistent hash ring algorithm or similar distribution mechanism can be utilized to distribute load across the set of cluster nodes and declarative rules engine instances in a deterministic manner that enables events to be routed and processed to each of the appropriate cluster nodes.

The implementations in the cluster computing environment include a cluster configurator 203, a cluster monitor 205, a set of cluster nodes 201, distributed management services 209, event management platform 211, payload router 207, shared storage 215, and optionally a data generator 213. One skilled in the art would understand that other components and resources are omitted from the diagram for sake of conciseness and clarity and that the cluster computing environment illustrated can be part of the multi-tenant architectures discussed further herein below.

More specifically, the cluster management aspects of the implementations that are introduced to enable the multi-tenant declarative rules engine operation include the cluster configurator 203, cluster monitor 205, cluster nodes 201, and payload router 207. The cluster configurator 203 implements the consistent hash ring algorithm. The cluster configurator 203 is responsible for building a new cluster configuration based on a cluster name, a number of cluster nodes and redundancy (e.g., 1 or 2). In one example implementation, the new cluster configuration will be stored in the distributed management services 209 (e.g., Apache Zookeeper) under /clusters/"Cluster Name"/ring node. The cluster configurator 203 can also rebuild (i.e., on system restart or for rebalancing) an existing cluster based on a number of cluster nodes (could be different from the existing configuration), redundancy, and existing nodes/tokens load. In the example implementation, the new configuration can be stored in the /clusters/"Cluster Name"/new-ring node. The distributed management services 209 are a component in the cluster computing environment that manage resources therein and the creation and handling of cluster nodes to execute instance of the declarative rules engine.

Figure 3:
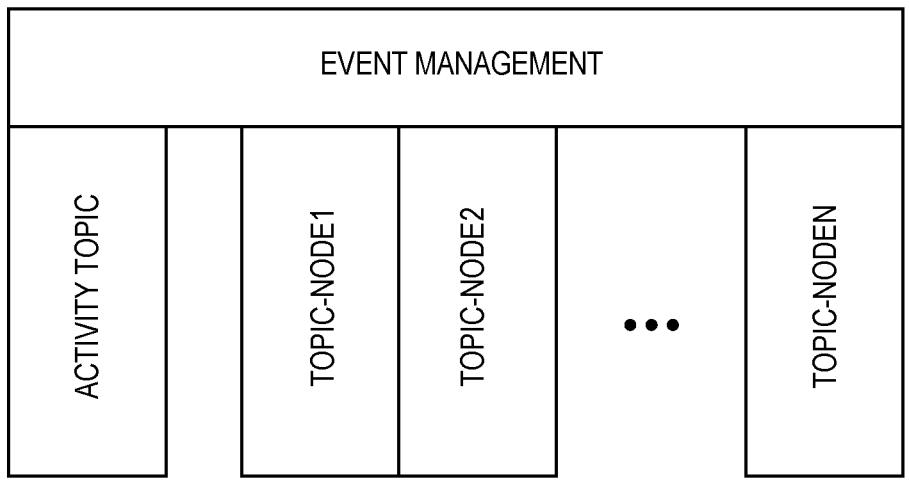
FIG. 3 is a block diagram of an event stream organization according to some example implementations.

A payload router 207 is responsible for routing events, referred to as payload, from an input event stream having a given topic to cluster nodes processing the specific topics. The event management component 211 can be a part or a whole of an event management platform (e.g., Apache Kafka) storing and processing events received from event producers and organized as event streams each having a topic or similar categorization. Each cluster node has its own event topic. FIG. 3 is a diagram of one implementation of a set of example topics managed by an event management system. The payload router 207 interacts with the event management 211 and distributed management services 209 to ensure that the events of a given topic for a given tenant are routed to the appropriate cluster node 201 to be processed. The payload router 207 can operate to route events as they are received, published, or processed. In other implementations, the payload router 207 configures the distributed management services 209 and event manager 211 to implement the routing of events and event streams to the appropriate cluster nodes 201.

The cluster monitor 205 is responsible for monitoring resource usage and load for each cluster node. The cluster monitor 205 can be responsible for rebuilding (e.g., rebalancing) the cluster. In an example implementation, the cluster monitor 205 can rebuild the cluster when a new configuration is available in the new-ring node that is established by the cluster configurator 203 at the distributed management services 209. In other implementations, the cluster monitor 205 can have more responsibilities such as generating the new configurations directly.

Each cluster node 201 is a cluster member that is a unit of execution in the cluster computing environment. The cluster node can implement the declarative rules engine as discussed herein with reference to FIG. 1. A cluster node embeds the declarative rules engine to perform the event processing including event stream merging processes. Tenants are assigned to different cluster nodes 201 using the consistent hash ring algorithm. In some implementations, a single tenant is not split across different cluster nodes 201. In other implementations, a tenant with heavy load can have multiple cluster nodes and declarative rules engine instances. The cluster nodes 201 operate on shared storage 215 that can store events or event streams or on event management 211 to implement the event processing and event stream merging processes. In some implementations, the number of cluster nodes is less than the number of tenants and the services of the cluster nodes are managed over time to rotate servicing of different tenants that are in an active or online state when being serviced by a cluster node or in a suspended or inactive state when awaiting servicing by an assigned cluster node. The state of inactive tenants can be stored in the shared storage 215 or similar location. Each cluster node can be stateless and transition to executing each tenant by loading the state of that tenant.

In some implementations, the cluster configuration is built using a "virtual" nodes concept, where each virtual node has a name—"NameN" where N is a number from 1 to node cluster count and represents a different tenant. When a cluster node process starts it is looking for a virtual node (i.e., tenant) that is not currently being served, i.e. a tenant that is not online or active. The cluster node registers the selected virtual node (e.g., setting host/port and administrative information. After selecting a virtual node, the cluster node restores the current state and the event topic offset that corresponded to the last stored state from the shared storage and then it is ready to process events from the cluster node topic.

In an optional implementation, a data generator is included. The data generator randomly generates incoming activities in the activity topic to emulate the operation of the system for testing purposes. The amount of data, the number of tenants, the number of days, and similar parameters can be specified in a configuration file for the operation of the data generator.

Cluster rebuilding is implemented across the cluster monitor 205, cluster nodes 201, cluster configurator 203 and payload router 207.

The cluster monitor 205 periodically checks for the existence of a new configuration (e.g., a new-ring node) in the distributed management services 209 provided by the cluster configurator 203. When the cluster monitor 205 finds a new configuration, then it starts the cluster rebuilding process. If a Payload Router 207 is online then the cluster monitor 205 sends a command to the suspend the Payload Router 207. The Payload router 207 stops sending payloads to the cluster node topics and suspends itself. In a case when Payload Router is already suspended, then the cluster monitor updates the suspension of the Payload Router 207.

After the Payload Router 207 has been suspended the cluster monitor 205 suspends each cluster node 201. The cluster monitor 205 sends the suspend command to online cluster nodes 201. Upon receiving the suspend command a cluster node 201 consumes all events from its assigned event topic (the payload router is already suspended and it does not submit new events to cluster node topics). After processing all outstanding messages, the cluster node 201 persists its state in the shared storage 215.

After suspending all online cluster nodes 201, the cluster monitor 205 suspends offline cluster nodes. In some implementations, the monitor iterates through all offline cluster nodes and for each cluster node it starts an offline cluster virtual node in the cluster monitor process (embedding the cluster node in the cluster monitor 205, then the cluster monitor suspends the embedded cluster node like cluster online nodes. This persists the state of the inactive cluster nodes into a shared storage rather than in active memory.

When all cluster nodes 201 are suspended, then the cluster monitor 205 calculates the differences between old and new cluster configuration and moves the tenant states in the shared storage to new destinations (i.e., reassigns the tenants to different cluster nodes according to the updated configuration). The cluster monitor 205 then replaces the old cluster configuration with the new one (e.g., replace the prior ring content with the new-ring content) and removes the new-ring node content. At this point, the cluster is rebuilt. The cluster monitor 205 sends a reload command to all cluster nodes and the Payload Router 207. Each cluster node selects a next tenant to services and reloads state for that tenant from the shared storage, removes suspended state, and starts processing events for the tenant.

Figure 4:
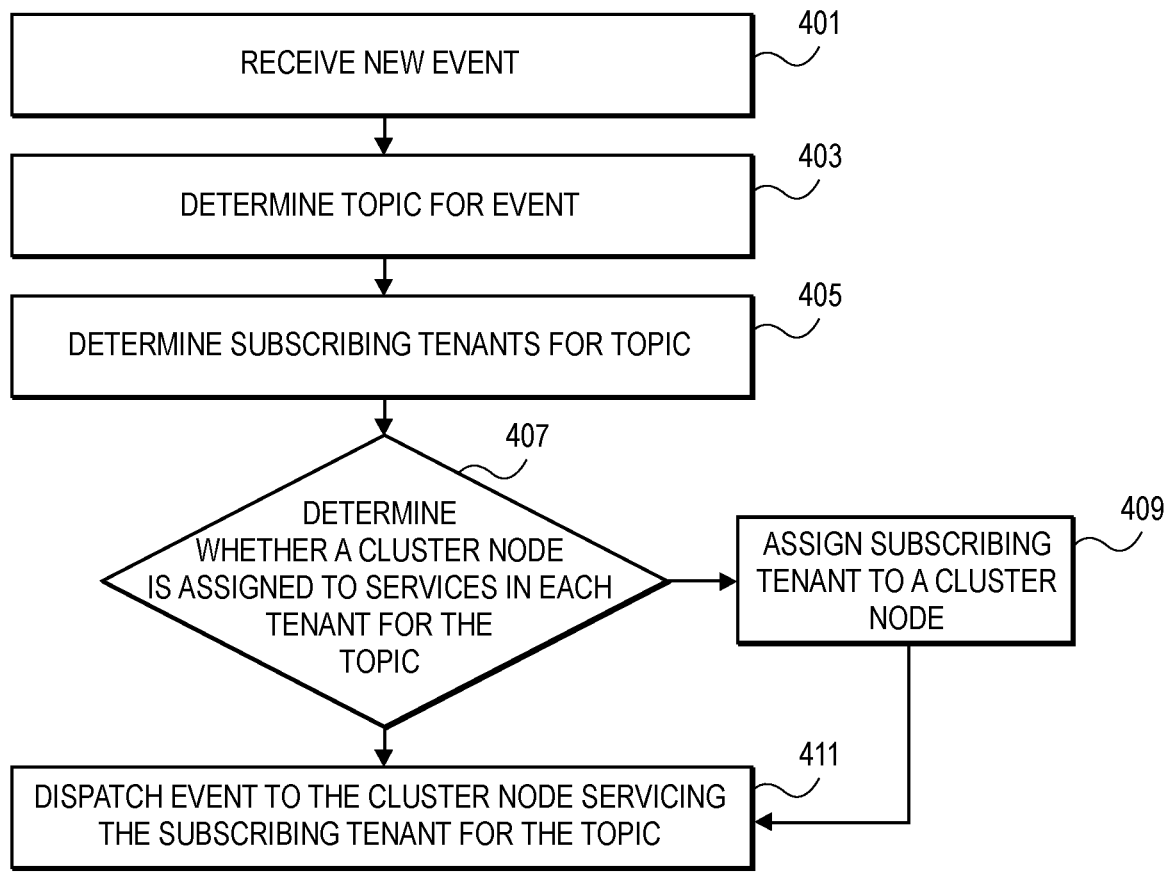
FIG. 4 is a flowchart of a process for a payload router according to some example implementations.

FIG. 4 is a flowchart of a process for a payload router according to some example implementations. In one implementation, a payload router manages the routing of events to the proper cluster node that is executing a declarative rules engine for a tenant in a cluster computing environment of a multi-tenant system. The payload router can receive or be notified of events that are being generated by an event management system or similar source of events (Block 401). The event is examined to determine a topic for the event (Block 403). The tenants that subscribe to the topic 405 are then determined (Block 405). The subscribing tenants can be queried from the event management system.

The payload router process determines based on a current cluster configuration, whether a cluster node has been assigned to service each tenant that subscribes to a given topic (Block 407). If no cluster node has been assigned for a given tenant, then the payload router assigns or coordinates with a cluster configurator to assign the tenant to a cluster node (Block 409). If the tenant is already assigned a cluster node or after assigning the tenant, then the event is dispatched to each cluster node that services a subscribing tenant (Block 411).

Figure 5:
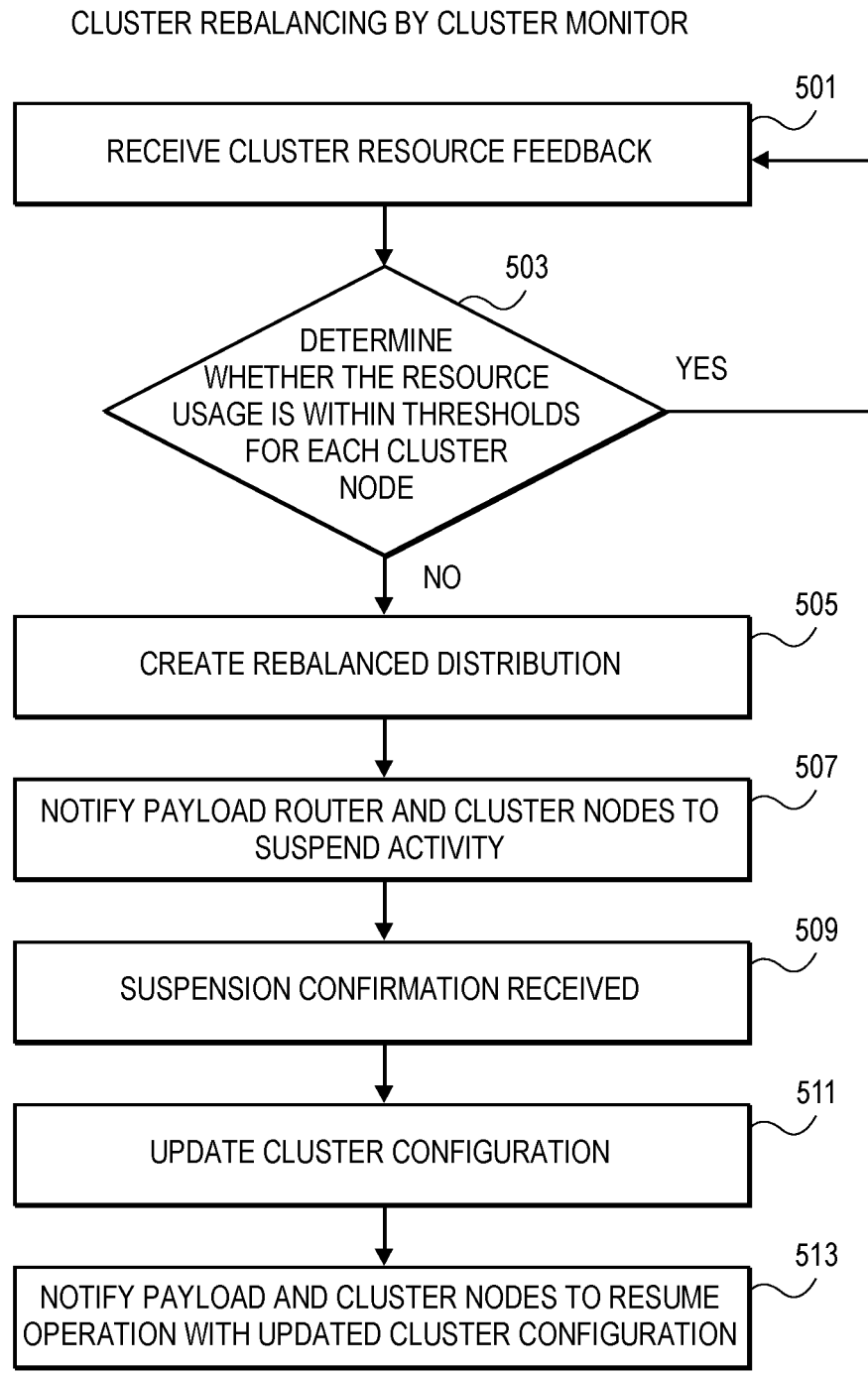
FIG. 5 is a flowchart of a process for rebalancing by a cluster monitor according to some example implementations.

FIG. 5 is a flowchart of a process for rebalancing by a cluster monitor according to some example implementations. In some implementations, a cluster monitor can initiate a rebalancing of cluster configuration in response to load distribution in the cluster. The cluster monitor can continuously receive cluster resource feedback (Block 501). The resource feedback can include resource usage (e.g., processor or memory usage), tenant to cluster node distribution, topic to cluster node distribution, and similar feedback. A check can be made whether the collected resource usage falls within acceptable threshold (Block 503). The threshold can be set at any level using any combination of resource usage metrics. If the threshold is not exceeded, then the process of the cluster monitor continues to collect resource usage feedback for the cluster nodes (Block 501). If the threshold is exceeded, then a rebalance distribution of topics and tenants to cluster nodes can be generated (Block 505). The cluster monitor or cluster configurator can construct the rebalanced distribution configuration using any algorithm or process to distribute the load.

Once the rebalance distribution starts or is ready to be implemented, then the cluster monitor can notify the payload router and cluster nodes to suspend activity (Block 507). The payload router and cluster nodes can complete processing of all events currently being handled before suspending activity. The cluster nodes can store the state of each tenant to a shared storage area. Once the suspension of the cluster nodes and payload router is confirmed (Block 509), then the cluster monitor can switch the configuration to the rebalanced distribution thereby replacing the prior configuration scheme (Block 511). With the cluster configuration switched to the new rebalanced configuration, then the cluster monitor can restart the operation of the cluster nodes and the payload router (Block 513). The cluster nodes load tenants to services and the process continues until the next rebalance.

In other implementations, the cluster configurator can initiate rebalancing and calculate new configurations in response to administrative input or similar factors. The cluster monitor can assist at the direction of the cluster configurator with the suspension, configuration switch, and reload process.

Figure 6:
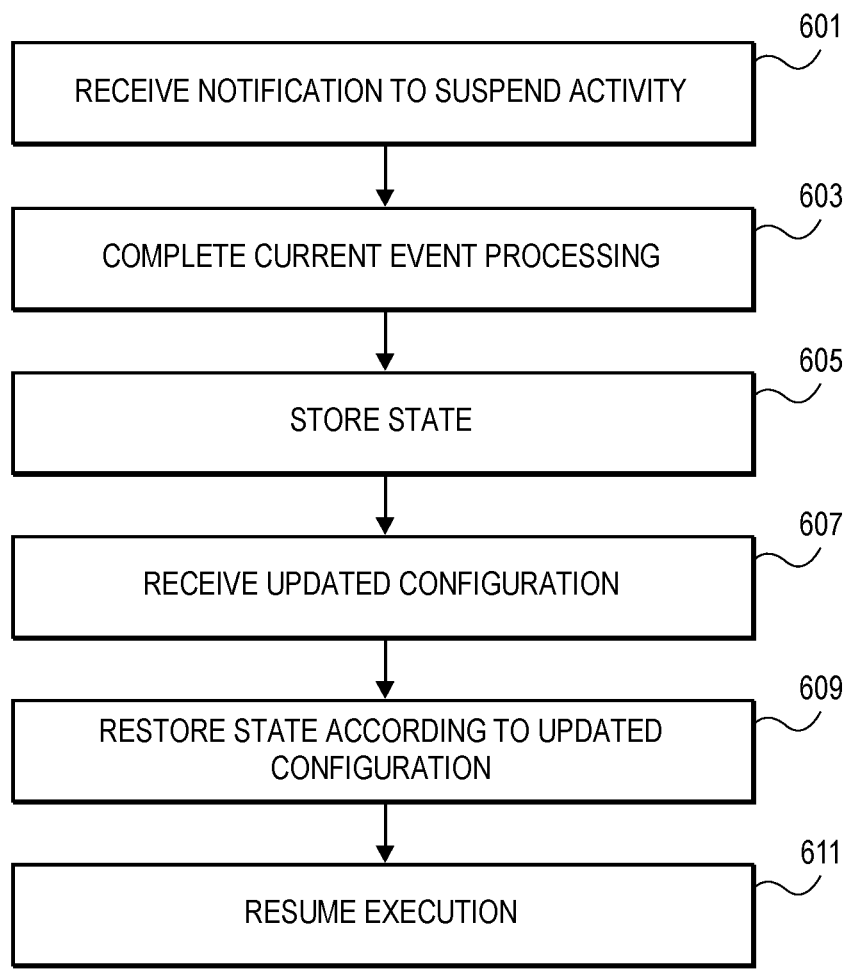
FIG. 6 is a flowchart of a rebalancing process by a cluster node according to some example implementations.

FIG. 6 is a flowchart of a rebalancing process by a cluster node according to some example implementations. The cluster nodes support rebalancing in response to receiving a notification to suspend activity from a cluster monitor (Block 601). The cluster nodes completes the processing of events that have been received (Block 603). Once all events have been processed, then the state of the tenant that is being executed is stored to a shared storage (Block 605). An updated configuration is set by the cluster monitor and/or the cluster configurator that redefines the tenants and/or topics serviced by each cluster (Block 607). The cluster node receives a notification from the cluster monitor/configurator to restart processing, which causes the cluster nodes to identify and load a tenant to process consistent with the updated configuration (Block T09). The cluster node then begins executing the processing of events for the tenant (e.g., executing a declarative rules engine to process events) (Block 611).

Figure 7:
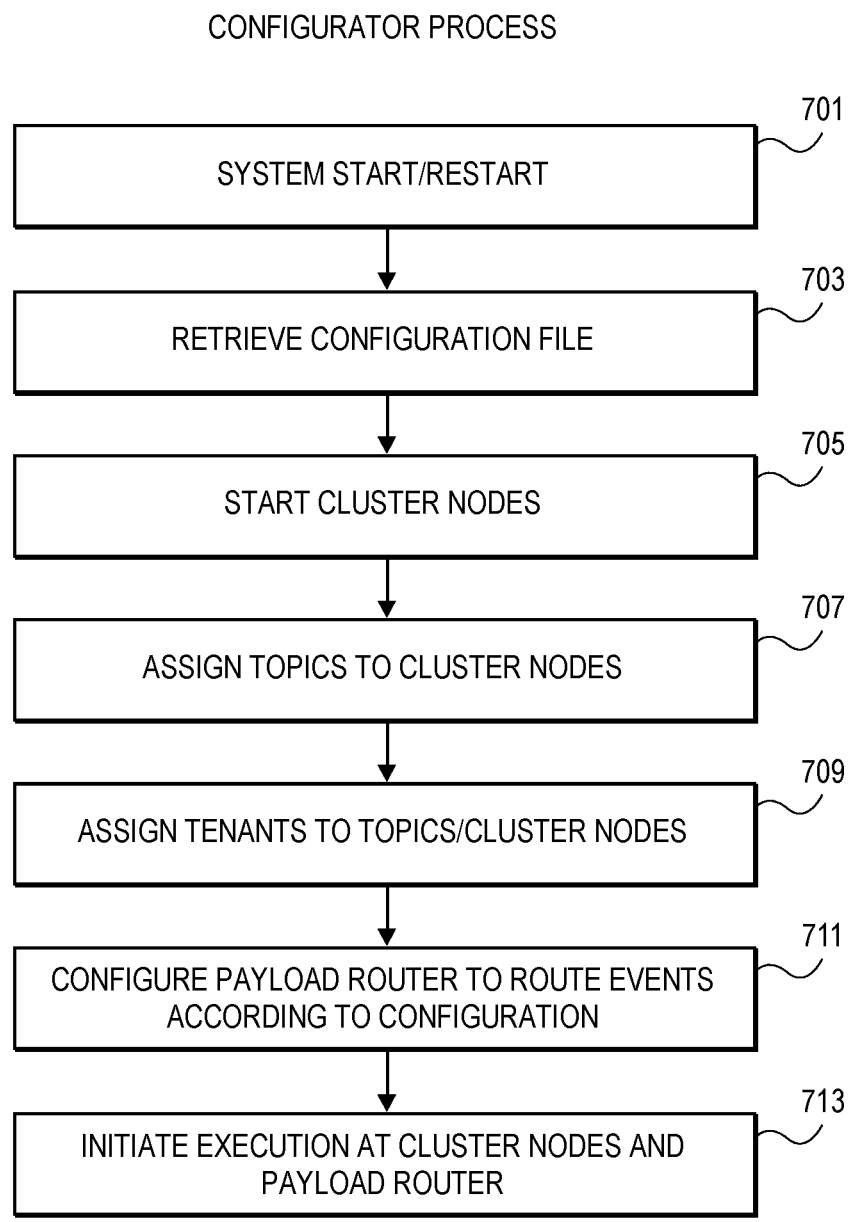
FIG. 7 is a flowchart of a configuration process by a configurator according to some example implementations.

FIG. 7 is a flowchart of a configuration process by a configurator according to some example implementations. In one implementation, the cluster configurator can be triggered to operate in response to a system start or restart (Block 701). In other implementations, the cluster configurator can be triggered to compute updated/rebalanced configurations or to implement rebalanced configurations that are provided from external sources (e.g., an administrator). The configurator can retrieve a configuration file during start-up or restart operations (Block 708). The configuration file can specify the assignment of topics and tenants to cluster nodes. The configurator can initialize or start cluster nodes (Block 705). Any number of cluster nodes can be initialized to service tenants. The configuration defines the assigned topics and tenants to cluster nodes, which can be implemented via the distributed management services or similar mechanism (Blocks 707 and 709). The payload router can similarly be configured to implement the routing of events according to the configuration from the event management system to the cluster nodes (Bock 711). With the configuration in place, the configurator can initiate the execution of the cluster nodes and payload router (Block 713).

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 8A:
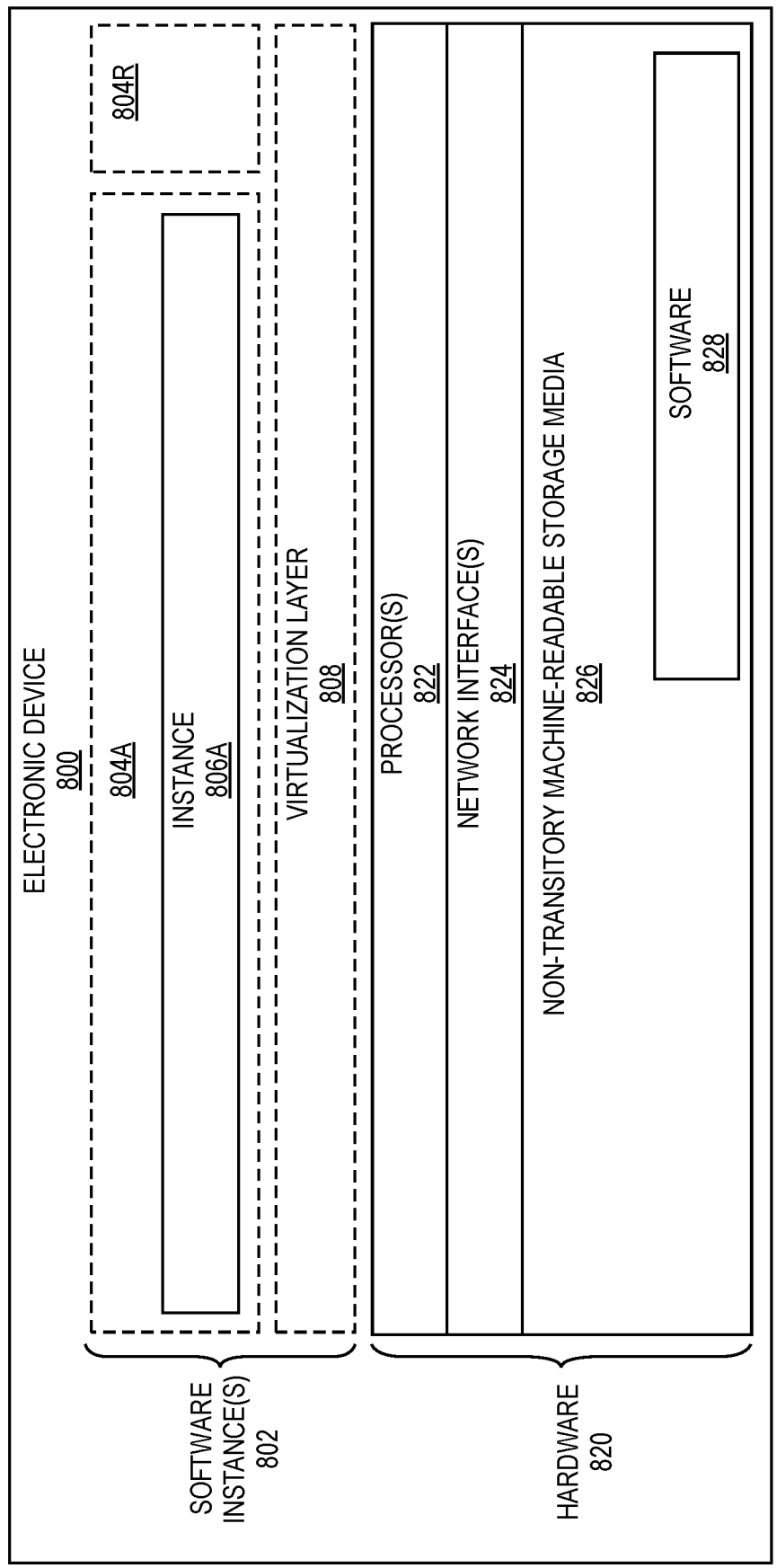
FIG. 8A is a block diagram illustrating an electronic device according to some example implementations.

FIG. 8A is a block diagram illustrating an electronic device 800 according to some example implementations. FIG. 8A includes hardware 820 comprising a set of one or more processor(s) 822, a set of one or more network interfaces 824 (wireless and/or wired), and non-transitory machine-readable storage media 826 having stored therein software 828 (which includes instructions executable by the set of one or more processor(s) 822). Each of the previously described stream handling service may be implemented in one or more electronic devices 800. In one implementation: 1) each of the end user clients is implemented in a separate one of the electronic devices 800 (e.g., in user electronic devices operated by users where the software 828 represents the software to implement end user clients to interface with the stream handling service (e.g., a web browser, a native client, a portal, a command-line interface, and/or an application program interface (API) based upon protocols such as Simple Object Access Protocol (SOAP), Representational State Transfer (REST), etc.)); 2) the declarative rules and cluster management services are implemented in a separate set of one or more of the electronic devices 800 (e.g., a set of one or more server electronic devices where the software 828 represents the software to implement the declarative rules and cluster management services); and 3) in operation, the electronic devices implementing the end user clients and the stream handling service would be communicatively coupled (e.g., by a network) and would establish between them (or through one or more other layers) connections for tracking activities that are sent to the stream handling service and returning metrics or similar data to the end user clients. Other configurations of electronic devices may be used in other implementations (e.g., an implementation in which the end user client and the declarative rules and cluster management services are implemented on a single electronic device 800).

In electronic devices that use compute virtualization, the set of one or more processor(s) 822 typically execute software to instantiate a virtualization layer 808 and software container(s) 804A-R (e.g., with operating system-level virtualization, the virtualization layer 808 represents the kernel of an operating system (or a shim executing on a base operating system) that allows for the creation of multiple software containers 804A-R (representing separate user space instances and also called virtualization engines, virtual private servers, or jails) that may each be used to execute a set of one or more applications; with full virtualization, the virtualization layer 808 represents a hypervisor (sometimes referred to as a virtual machine monitor (VMM)) or a hypervisor executing on top of a host operating system, and the software containers 804A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 828 (illustrated as instance 806A) is executed within the software container 804A on the virtualization layer 808. In electronic devices where compute virtualization is not used, the instance 806A on top of a host operating system is executed on the "bare metal" electronic device 800. The instantiation of the instance 806A, as well as the virtualization layer 808 and software containers 804A-R if implemented, are collectively referred to as software instance(s) 802.

Alternative implementations of an electronic device may have numerous variations from that described above. For example, customized hardware and/or accelerators might also be used in an electronic device.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Exemplary Environment

Figure 8B:
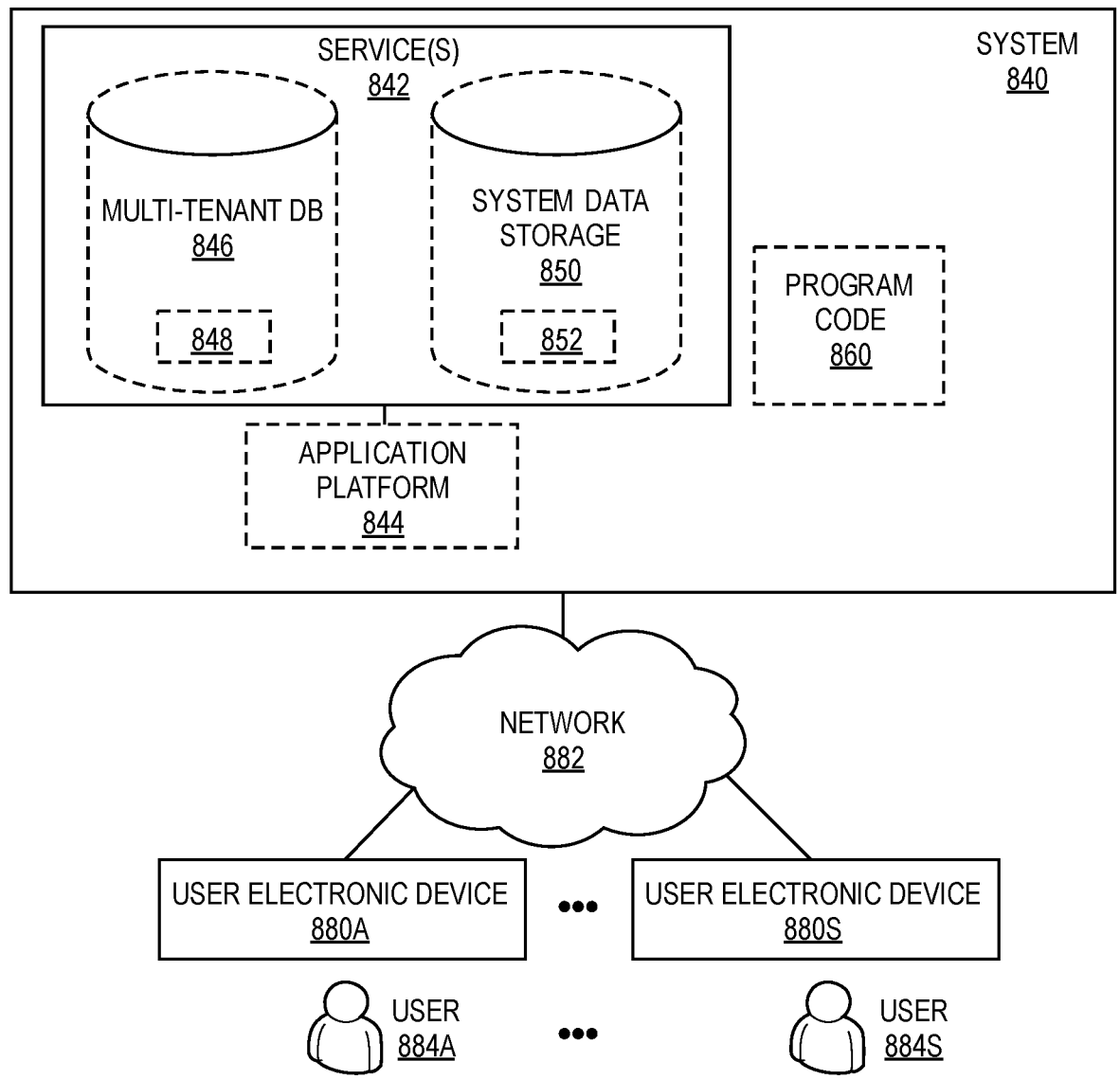
FIG. 8B is a block diagram of an environment where a payload router, cluster node, and/or cluster monitor may be deployed, according to some implementations.

FIG. 8B is a block diagram of an environment where a declarative rules engine, payload router, cluster node, and/or cluster monitor may be deployed, according to some implementations. A system 840 includes hardware (a set of one or more electronic devices) and software to provide service(s) 842, including the declarative rules and cluster management services as described herein. The system 840 is coupled to user electronic devices 880A-S over a network 882. The service(s) 842 may be on-demand services that are made available to one or more of the users 884A-S working for one or more other organizations (sometimes referred to as outside users) so that those organizations do not need to necessarily be concerned with building and/or maintaining a system, but instead makes use of the service(s) 842 when needed (e.g., on the demand of the users 884A-S). The service(s) 842 may communication with each other and/or with one or more of the user electronic devices 880A-S via one or more Application Programming Interface(s) (APIs) (e.g., a Representational State Transfer (REST) API). The user electronic devices 880A-S are operated by users 884A-S.

In one implementation, the system 840 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 840 may include an application platform 844 that enables PAAS for creating, managing, and executing one or more applications developed by the provider of the application platform 844, users accessing the system 840 via one or more of user electronic devices 880A-S, or third-party application developers accessing the system 840 via one or more of user electronic devices 880A-S.

In some implementations, one or more of the service(s) 842 may utilize one or more multi-tenant databases 846 for tenant data 848, as well as system data storage 850 for system data 852 accessible to system 840. In certain implementations, the system 840 includes a set of one or more servers that are running on server electronic devices and that are configured to handle requests for any authorized user associated with any tenant (there is no server affinity for a user and/or tenant to a specific server). The user electronic device 880A-S communicate with the server(s) of system 840 to request and update tenant-level data and system-level data hosted by system 840, and in response the system 840 (e.g., one or more servers in system 840) automatically may generate one or more Structured Query Language (SQL) statements (e.g., one or more SQL queries) that are designed to access the desired information from the one or more multi-tenant database 846 and/or system data storage 850.

In some implementations, the service(s) 842 are implemented using virtual applications dynamically created at run time responsive to queries from the user electronic devices 880A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 860 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 844 includes an application setup mechanism that supports application developers' creation and management of applications, which may be saved as metadata by save routines. Invocations to such applications, including the declarative rules and cluster management services service, may be coded using Procedural Language/

Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 882 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 840 and the user electronic devices 880A-S.

Each user electronic device 880A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 840. For example, the user interface device can be used to access data and applications hosted by system 840, and to perform searches on stored data, and otherwise allow a user 884 to interact with various GUI pages that may be presented to a user 884. User electronic devices 880A-S might communicate with system 840 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 880A-S might include an HTTP client, commonly referred to as a "browser," for sending and receiving HTTP messages to and from server(s) of system 840, thus allowing users 884 of the user electronic device 880A-S to access, process and view information, pages and applications available to it from system 840 over network 882.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for handling asynchronous event streams in a multi-tenant system, the method comprising:
   receiving, by a rules engine, at least a first event stream and a second event stream, wherein
      events of the first event stream and of the second event stream are published asynchronously and convey information about operations occurring in the multi-tenant system,
      the first event stream comprising a first topic and a first partition in data of events in the first event stream, and
      the second event stream comprising a second topic and a second partition in data of events in the second event stream;

determining, by pattern matching of the rules engine, whether the first topic and the first partition meet conditions of a rule defined by a tenant of the multi-tenant system, wherein
the first topic and the second topic represent source information, or content type information for the respective events, and
the first partition and the second partition represent respective identifiers for tenants of the multi-tenant system for the respective events; and
merging, by the rules engine, data of one or more of the events of the second event stream with data of one or more of the events of the first event stream, in response to the data of the events of the first event stream meeting the conditions of the rule, by grouping the second topic with the first topic and adjusting an order of the events in the second event stream to align with an order of the events in the first event stream within a defined timeframe based on the grouped topics.

2. The method of claim 1, wherein the rules engine is implemented in a cluster node of a cluster computing environment.

3. The method of claim 2, further comprising:
receiving, by a cluster monitor, a resource feedback from the multi-tenant system;
determining whether resource usage for the cluster node is within thresholds set for cluster operation; and
initiating a rebalancing of cluster nodes in response to the resource usage exceeding the thresholds.

4. The method of claim 1, further comprising:
initiating, by a cluster configurator, a set of cluster nodes in a cluster computing environment; and
assigning, by the cluster configurator, each cluster node in the set of cluster nodes to process at least the first topic of an event management platform for the tenant of the multi-tenant system.

5. The method of claim 4, further comprising:
configuring a payload router to route events from the event management platform to a respective cluster node in the set of cluster nodes according to the first topic and the tenant.

6. The method of claim 1, further comprising:
notifying, by a cluster monitor, a payload router and a set of cluster nodes to suspend activity;
updating, by the cluster monitor, cluster configuration to rebalance topic and tenant assignments across the set of cluster nodes; and
notifying, by the cluster monitor, the payload router and the set of cluster nodes to restart operation with the updated cluster configuration.

7. The method of claim 1, further comprising:
receiving a notification to suspend activity from a cluster configurator or cluster monitor; and
storing state of the rules engine for the tenant to a shared storage.

8. The method of claim 7, further comprising:
receiving notification by a cluster node to resume activity with an updated configuration from a cluster configurator or cluster monitor; and
restoring state by the cluster node for the rules engine from the shared storage.

9. The method of claim 1, further comprising:
routing the events of each event stream by a payload router to a respective cluster node according to cluster configuration.

10. A non-transitory machine-readable storage medium that provides instructions that, when executed by a processor, will cause the processor to perform operations comprising:
receiving, by a rules engine, at least a first event stream and a second event stream, wherein
events of the first event stream and of the second event stream are published asynchronously and convey information about operations occurring in the multi-tenant system,
the first event stream comprising a first topic and a first partition in data of events in the first event stream, and
the second event stream comprising a second topic and a second partition in data of events in the second event stream;
determining, by pattern matching of the rules engine, whether (i) the first topic and the first partition, or (ii) the second topic and the second partition meet conditions of a rule defined by a tenant of the multi-tenant system, wherein
the first topic and the second topic represent source information, or content type information for the respective events, and
the first partition and the second partition represent respective identifiers for tenants of the multi-tenant system for the respective events; and
merging, by the rules engine, data of one or more of the events of the second event stream with data of one or more of the events of the first event stream, in response to the data of the events of the first event stream meeting the conditions of the rule, by grouping the second topic with the first topic and adjusting an order of the events in the second event stream to align with an order of the events in the first event stream within a defined timeframe based on the grouped topics.

11. The non-transitory machine-readable storage medium of claim 10, wherein the rules engine is implemented in a cluster node of a cluster computing environment.

12. The non-transitory machine-readable storage medium of claim 11, having further instructions stored therein to cause said processor to perform further operations comprising:
receiving, by a cluster monitor, a resource feedback from the multi-tenant system;
determining whether resource usage for the cluster node is within thresholds set for cluster operation; and
initiating a rebalancing of cluster nodes in response to the resource usage exceeding the thresholds.

13. The non-transitory machine-readable storage medium of claim 10, having further instructions stored therein to cause said processor to perform further operations comprising:
initiating, by a cluster configurator, a set of cluster nodes in a cluster computing environment; and
assigning, by the cluster configurator, each cluster node in the set of cluster nodes to process at least the first topic of an event management platform for the tenant of the multi-tenant system.

14. The non-transitory machine-readable storage medium of claim 13, having further instructions stored therein to cause said processor to perform further operations comprising: configuring a payload router to route events from the event management platform to a respective cluster node in the set of cluster nodes according to the first topic and the tenant.

15. The non-transitory machine-readable storage medium of claim 10, having further instructions stored therein to cause said processor to perform further operations comprising:
  notifying, by a cluster monitor, a payload router and a set of cluster nodes to suspend activity;
  updating, by the cluster monitor, cluster configuration to rebalance topic and tenant assignments across the set of cluster nodes; and
  notifying, by the cluster monitor, the payload router and the set of cluster nodes to restart operation with the updated cluster configuration.

16. The non-transitory machine-readable storage medium of claim 10, having further instructions stored therein to cause said processor to perform further operations comprising:
  receiving a notification to suspend activity from a cluster configurator or cluster monitor; and
  storing state of the rules engine for the tenant to a shared storage.

17. The non-transitory machine-readable storage medium of claim 16, having further instructions stored therein to cause said processor to perform further operations comprising:
  receiving notification by a cluster node to resume activity with an updated configuration from a cluster configurator or cluster monitor; and
  restoring state by the cluster node for the rules engine from the shared storage.

18. The non-transitory machine-readable storage medium of claim 10, having further instructions stored therein to cause said processor to perform further operations comprising:
  routing the events of each event stream by a payload router to a respective cluster node according to cluster configuration.

19. A computing system to implement a method for handling asynchronous event streams in a multi-tenant system, the computing system comprising:
  a non-transitory machine-readable storage medium having stored therein a rules engine; and
  a processor coupled to the non-transitory machine-readable storage medium, the processor to execute the rules engine to:
    receive at least a first stream of events and a second stream of events, wherein
      events of the first event stream and of the second event stream are published asynchronously and convey information about operations occurring in the multi-tenant system,
      the first event stream comprising a first topic and a first partition in data of events in the first event stream, and
      the second event stream comprising a second topic and a second partition in data of events in the second event stream;
    determine, by pattern matching of the rules engine, whether (i) a first topic and a first partition in data of events of the first event stream, or (ii) a second topic and a second partition in data of events of the second event stream, meet conditions of a rule defined by a tenant of the multi-tenant system, whether (i) the first topic and the first partition, or (ii) the second topic and the second partition meet conditions of a rule defined by a tenant of the multi-tenant system, wherein
      the first topic and the second topic represent source information, or content type information for the respective events, and
      the first partition and the second partition represent respective identifiers for tenants of the multi-tenant system for the respective events; and
    merge data of one or more of the events of the second event stream with data of one or more of the events of the first event stream, in response to the data of the events of the first event stream meeting the conditions of the rule, by grouping the second topic with the first topic and adjusting an order of the events in the second event stream to align with an order of the events in the first event stream within a defined timeframe based on the grouped topics.

20. The computing system of claim 19, wherein the rules engine is implemented in a cluster node of a cluster computing environment, the processor further to execute a cluster configurator to initiate a set of cluster nodes in a cluster computing environment, and a cluster configurator to assign each cluster node in the set of cluster nodes to process at least the first topic of an event management platform for the tenant of the multi-tenant system.

* * * * *